United States Patent Office 3,193,391
Patented July 6, 1965

---

3,193,391
USE OF BACTERIA IN CURED MEATS
Clarence E. Jansen, Palos Heights, and John H. Silliker, Park Forest, Ill., assignors to Swift & Company, Chicago, Ill., a corporation of Illinois
No Drawing. Filed Oct. 6, 1961, Ser. No. 143,316
10 Claims. (Cl. 99—157)

This invention relates to an improved process for preparing cured meats. More particularly, this invention relates to a process for the development of an improved cured flavor in meat products such as ham, picnics, and bacon.

The improved cured flavors refers to a flavor which is attributed to more than the combination of flavors imparted to meat by means of preserving and flavoring agents such as sodium chloride, sodium nitrate, sodium nitrite, sugar, smoke, spices, and so forth, used in traditional curing processes. It is a unique flavor which is largely derived from the growth and action of flavor-producing bacteria during the curing or preserving process. Traditional preserving or curing processes, which include pickling of meat by immersion in a suitable solution of curing salts and/or smoking for various periods in the presence of wood smoke, usually require a period of from about 20 to 90 days. During this period, it has been found that the small amounts of flavor-producing bacteria inherently present in the meat at the beginning of pickling and/or smoking period have ample opportunity to multiply to a flavor-producing level, and therefore impart the characteristic "cured flavor" to the pickled and/or smoked meat product.

During recent years, however, the meat industry has developed and generally adapted rapid pickling and smoking techniques, which basically involve the injecting of pickle solutions and smoke under high pressures into meat, that have generally reduced the traditional 20 to 90 day pickling-smoking period to a matter of hours.

While these recently adapted high-speed pickling-smoking techniques have greatly reduced the time and expense previously incurred in the large scale pickling and smoking of meat products, they generally fail to produce a completely satisfactory cured flavor in the final product due to the fact that the relatively small number of flavor-producing bacteria inherently present in meat do not have sufficient time to develop or multiply and produce a desired amount of flavor conversion within the meat. Hence, it has been the general consensus of opinion throughout the industry, that true "cured flavor" may not be developed in meat products produced by rapid pickling and smoking techniques, and that in order to obtain a fully satisfactory cured flavor, the traditional 20 to 90 day processing techniques must be altered so that sufficient bacterial growth and flavor conversion may take place.

It is, therefore, an object of the present invention to provide an improved method for producing a cured flavor in meat products.

It is another object of the present invention to provide a method for quickly imparting to meat products a cured flavor characteristic of meat products subjected to a long-term curing process.

It is a further object of the present invention to provide a method for developing a high level of flavor-producing bacteria in meat products which may be advantageously used in conjunction with conventional rapid pickling and/or smoking techniques.

These and still further objects of the present invention will become readily apparent to those skilled in the art from the following detailed description of the present invention.

In general, the present invention contemplates a method for rapidly developing a cured flavor in meat products through the use of specially adapted flavor-producing bacteria.

More specifically, the present invention involves the inoculation of meat products such as ham, picnics and bacon with a substantial amount of a species of bacteria selected from the families Lactobacteriaceae and Micrococcaceae, and subsequently subjecting the inoculated product to a short-term incubation period wherein the inoculum rapidly increases to a flavor-producing level.

The bacteria used in the present invention are those flavor-producing bacteria selected from the families generally known as Lactobacteriaceae and Micrococcaceae bacteria. Specific general of bacteria classified under the family of Lactobacteriaceae and those genera known as Diplococcus, Streptococcus, Leuconostoc and Lactobacillus. Suitable genera classified under the family of Micrococcaceae include those genera identified as Pediococcus, Micrococcus and Gaffkya. Suitable species classified under the families and genera given above are *Micrococcus candidus*, *Gaffkya tetragena*, *Pediococcus cerevisiae*.

Inoculation of the meat products may be carried out by any one or a combination of procedures. For example, a liquid suspension of viable bacteria of a suitable type may be applied to the surface of a meat product by dipping, or spraying, or in the alternative, a bacteria suspension may be dispersed through the interior of the meat by way of intervascular or stitch pumping techniques well known to those skilled in the art. In many cases, the inoculum may be introduced into the product in a mixture with pickle solution which is applied either by pumping, or by absorption, e.g., soaking techniques.

In general, the total number of bacteria applied to the product during inoculation is that number which is found to produce a satisfactory degree of flavor development in a reasonable incubation period. The optimum inoculum bacteria count must be determined for each set of processing variables which necessarily involve the type of meat, manner of application, specie of bacteria used, temperature and duration of the incubation period utilized, and so forth. In broadest terms, however, the minimum number of bacteria which must be applied represents a concentration of from about 1 to about 2 million bacteria per gram of meat being treated. Obviously, since the number of bacteria multiply a great number of times during the subsequent incubation period, there is no theoretical maximum number of bacteria which may be applied during the inoculation; however, the minimal number of bacteria specified above must be used to initiate a satisfactory increase in an incubation period of reasonable duration, namely, from about 8 to about 10 hours. In some cases involving spraying of a suspension of bacteria on pickled meat products suspensions containing 50 to about 100 million bacteria per ml. of solution may be used.

After the meat products have been suitably inoculated, the product must be held under conditions which cause the bacteria to multiply to the desired flavor development level. The specific incubation, i.e., heating period used, depends on several processing variables such as temperatures used, species of bacteria, type of meat and so forth. However, it has generally been found that a sufficient level of flavor development (bacteria growth) takes place within a period of from about 8 to about 10 hours when in incubation temperature in the range of from about 50 to 110° F. is maintained. The incubation of the meat product may be carried out prior to or after a pickle application, which may be done in the conventional manner such as by pumping or soaking in brine. It has been found that a suitable degree of flavor development generally takes place when the bacteria count per gram of meat reaches a range of from about 10 to about 50 million. Therefore, it is obvious that by following the bacterial development in a given meat product undergoing incubation, an operator may readily determine the point at which a given meat product has achieved a sufficient degree of flavor development which is contributed to bacterial growth.

Most commercial smoking operations are carried out at a temperature range of from about 40 to 148° F. This range is well within the temperature range of from about 50 to 110° F. at which multiplication of bacteria used in the present invention rapidly occurs. Therefore, when meat product is subjected to a subsequent smoking step after inoculation, the bacterial incubation period and the smoking operation may be advantageously combined, that is, carried out concurrently. Actual practice has shown that the times and temperatures used for a commercial smoking operation are generally satisfactory conditions for incubation of the bacteria herein utilized.

In addition to meat products such as hams, picnics, and bacon, the meat products which may be advantageously treated in the present invention include: tongue, luncheon meat and fermented sausage. The products treated may include the above mentioned products in all stages of processing or during as well as totally fresh products. That is, the meat products to which the bacteria herein contemplated are applied may be partially pickled, fully pickled, partially smoked and so forth. The meat products may also be initially subjected to a sterilization step which may be effected by heat, irradiation and so forth, while sterilization or pasteurization may, in some cases, be preferred in the practice of the present invention, it is not absolutely necessary in that the strains of flavor producing bacteria used herein are generally found to be dominating strains in that they will often multiply to the exclusion of other bacteria strains which may be present in the meat products before inoculation.

After having been subjected to the above incubation periods, the meat products may be subjected to any required processing and packaging operations required to effect a completed product.

Having generally described the invention, the following specific examples are set forth to illustrate specific embodiments thereof:

Example I

About 25 cc. of a suspension of *Pediococcus cerevisiae* containing $500 \times 10^6$ cells per cc. was sprayed on the surface of green bellies. Subsequent to spraying, the bellies were pumped with 400 ml. of standard nitrate-nitrite containing curing pickle. The pumped bellies were then subjected to a smoking operation for 18 hours at a house temperature of 125–130° F. At the termination of the smoking step, the bacterial count of the meat was found to be 30 million cells per gram of treated belly.

Examples II–XX.—Ham

Hams were pumped with standard pumping pickle to which *Pediococcus cerevisiae* were added so that each ml. of pickle contained 1 million cells. The hams were then processed in a smoke house for 16 hours with a house temperature of 150° F.

Samples of the above treated product were submitted to a taste panel made up of four persons who compared the above products with corresponding uninoculated products, as well as with corresponding products treated under a conventional long term curing process. In every case it was found that the products cured with the process set forth herein were found to be superior in flavor when compared to the non-treated product, and compared very well with the flavor developed in similar products subject to a conventional term, i.e., 20 to 60 day, curing process.

As seen from the above description and examples, the present invention offers to those engaged in the meat industry of a process for quickly developing in meat a cured flavor which was heretofore only achieved by means of an extended and therefore relatively expensive curing process.

Obviously many modifications and variations of the invention as hereinbefore set forth may be made without departing from the spirit and scope thereof, and therefore only such limitations should be imposed as are indicated in the appended claims.

We claim:

1. A method for the rapid imparting of cured flavor to cuts of meat which comprises: inoculating cuts of meat with a concentration of flavor-producing bacteria of at least 1 million viable cells per gram of meat, said bacteria selected from the group consisting of the genera Diplococcus, Streptococcus, Leuconostoc and Lactobacillus of the family Lactobacteriaceae and the genera Pediococcus, Micrococcus and Gaffkya of the family Micrococcaceae and mixture thereof, and thereafter subjecting said meat to incubation temperatures from about 50° to about 110° F. for about 8–10 hours, whereby the concentration of said bacteria is sufficient to impart the desired cured flavor thereto.

2. The method of claim 1 wherein the cuts of meat are partially sterilized.

3. The method of claim 1 wherein the incubation period is carried out within the temperature range from 40° to about 148° F. in the presence of smoke.

4. The method of claim 1 wherein the cuts of meat are inoculated by spraying.

5. In a method of imparting a cured flavor to cuts of meat subjected to rapid processing techniques, the steps which comprise: applying a suitable aqueous pickle to the surface of cuts of meat, said pickle having a suspended bacteria count of at least 1 million per cc. and said bacteria selected from the group consisting of the genera Diplococcus, Streptococcus, Leuconostoc and Lactobacillus of the family Lactobacteriaceae and the genera Pediococcus, Micrococcus and Gaffkya of the family Micrococcaceae and mixtures thereof, and thereafter subjecting said meat to an incubation period from about 8 to about 10 hours at a temperature of from about 40° F. to about 148° F. whereby a desirable cured flavor is imparted thereto.

6. A method of claim 5 wherein the incubation period is carried out in the presence of smoke.

7. The method of claim 6 wherein the bacteria containing pickle solution is injected under pressure into said meat.

8. The method of claim 5 wherein the treated meat products are selected from the group consisting of hams, tongues, bacon, picnics, pressed hams, and pork bellies.

9. The method of claim 5 wherein the meat products are immersed in a bacteria containing pickle solution for a period of from instantaneously to about 1 hour.

10. In a method of imparting a cured flavor to cuts of meat subjected to rapid processing techniques, the steps which comprise: spraying a suitable aqueous pickle on cuts of meat, said pickle having a bacteria count from about 50 to about 100 million per cc. of solution and said bacteria selected from the group consisting of the genera Diplococcus, Streptococcus, Leuconostoc and Lactobacillus of the family Lactobacteriaceae and the genera Pediococcus, Micrococcus and Gaffkya of the family Micrococcaceae and mixtures thereof, and thereafter subjecting said meat to a temperature of from about 40° to about 148° F. for a time sufficient to impart the desired cured flavor thereto.

(References on following page)

References Cited by the Examiner

UNITED STATES PATENTS

| | | | |
|---|---|---|---|
| 2,225,783 | 12/40 | Jensen et al. | 99—109 |
| 2,907,661 | 10/59 | Niven et al. | 99—109 |
| 2,994,085 | 7/61 | Teich et al. | 99—159 |

OTHER REFERENCES

Mills et al., American Meat Institute, Bulletin No. 38 (Sept. 1958). Article entitled: "Use of *Pediococcus cerevisiae* Starter Culture in Pork Roll," pages 3 to 13.

McLean, Applied Microbiology, vol. 7, No. 2, Mar. 1959, pages 81 to 83.

The Science of Meat and Meat Products, 1960, pages 168–169, Freeman & Co., distributed by Reinhold Publishers, N.Y.

A. LOUIS MONACELL, *Primary Examiner.*

ABRAHAM H. WINKELSTEIN, *Examiner.*